(12) United States Patent
Dahle

(10) Patent No.: US 7,792,063 B2
(45) Date of Patent: Sep. 7, 2010

(54) METHOD, APPARATUS, AND COMPUTER PROGRAM PRODUCT FOR GATEKEEPER STREAMING

(75) Inventor: Hakon Dahle, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 751 days.

(21) Appl. No.: 11/526,764

(22) Filed: Sep. 26, 2006

(65) Prior Publication Data
US 2007/0127463 A1 Jun. 7, 2007

(30) Foreign Application Priority Data
Sep. 26, 2005 (NO) .................. 20054449

(51) Int. Cl.
*H04L 12/56* (2006.01)
*H04L 12/16* (2006.01)

(52) U.S. Cl. .............. 370/260; 370/270; 370/390; 370/432; 709/204

(58) Field of Classification Search .......... 725/37, 725/94; 370/260–263, 270, 390, 432; 709/203, 709/204
See application file for complete search history.

(56) References Cited

U.S. PATENT DOCUMENTS 6,674,734 B1 1/2004 Hsu et al.
6,769,127 B1* 7/2004 Bonomi et al. ............... 725/39
7,043,528 B2 5/2006 Schmitt et al.
7,313,593 B1* 12/2007 Pulito et al. ............... 709/204
7,346,912 B2* 3/2008 Seebaldt .................... 719/328
2002/0033880 A1* 3/2002 Sul et al. ............... 348/14.09
2002/0126201 A1 9/2002 Schmitt et al.
2003/0210694 A1* 11/2003 Jayaraman et al. ......... 370/392
2004/0139088 A1* 7/2004 Mandato et al. ........... 707/100
2004/0141500 A1 7/2004 Pavlak et al.
2004/0207724 A1 10/2004 Crouch et al.
2005/0180400 A1 8/2005 Morris

FOREIGN PATENT DOCUMENTS

WO   WO 03/107622 A1   12/2003

* cited by examiner

*Primary Examiner*—John Pezzlo
(74) *Attorney, Agent, or Firm*—Oblon, Spivak, McClelland, Maier & Neustadt, L.L.P.

(57) ABSTRACT

A conferencing Gatekeeper configured to be adjusted so as to forward a conferencing media stream to be recorded to an appropriate streaming/archiving server, or alternatively to have streaming and archiving modules incorporated. Further, a method and computer program product for archiving or streaming media data between a plurality of endpoints through said gatekeeper.

14 Claims, 4 Drawing Sheets

METHOD, APPARATUS, AND COMPUTER PROGRAM PRODUCT FOR GATEKEEPER STREAMING

FIELD OF THE INVENTION

The present invention is related to archiving, streaming video conferencing and web conferencing systems. In particular, embodiments of the present invention are related to a method, apparatus, and computer program product for archiving or streaming media data between a plurality of endpoints through a gatekeeper.

BACKGROUND OF THE INVENTION

A number of technological systems can be used to have a meeting among participants not located in the same area.

The most realistic substitute of real meetings is high-end conventional video conferencing systems. Conventional video conferencing systems comprise a number of end-points communicating real-time video, audio and/or data streams over WAN, LAN and/or circuit switched networks. The end-points include one or more monitor(s), camera(s), microphone(s) and/or data capture device(s), and a codec, which encodes and decodes outgoing and incoming streams, respectively. In addition, a centralized source, known as a Multipoint Control Unit (MCU), is needed to link the multiple end-points together. The MCU links the multiple end-points together by receiving the multimedia signals (audio, video and/or data) from end-point terminals over point-to-point connections, processing the received signals, and retransmitting the processed signals to selected end-point terminals in the conference.

Considerable effort has been directed to minimizing the extra capabilities that must be provided to videoconferencing terminal equipment. Conventionally, this is appreciated by considering Recommendation H.323 of the International Telecommunication Union's Telecommunication Standardization Sector, which is incorporated herein by reference in its entirety. H.323 is an umbrella standard for video conferencing on packet switched networks, including IP networks.

Most systems for implementing the H.323 approach also include a gatekeeper. A gatekeeper manages the videoconferencing activities of various endpoints and other equipment within a "zone" of such equipment that has registered with the gatekeeper in accordance with procedures that H.323 sets forth. The gatekeeper's responsibilities vary from implementation to implementation, but they typically include granting videoconference access to the network on the basis of whatever policies the administrator has imposed, allocating network bandwidth among videoconferences, and providing address translation.

Giving the gatekeeper the address-translation task is one way in which system designers minimize endpoint-capability requirements: they thereby relieve the endpoints of the need to keep track of various potential participants' network addresses. To designate a called party, for example, a user may enter an easily remembered alias such as "doe.john@marketing.com." For actual signal transmission to the other party, though, that alias must be translated into a network address such as "130.239.67.2." Rather than maintaining a translation table, which would ordinarily require frequent updating, the endpoint simply sends a message to the gatekeeper asking for address resolution.

In a typical IP based videoconference, endpoints connect by first setting up the call through a Gatekeeper, which resolves the dialled address, and then media is sent either directly between the called parties or media can be routed through the Gatekeeper or PBX. This is the case for both point-to-point and multipoint calls.

In some cases it may be a requirement to record the content of the video conference/call. Both the audio and the video are normally required for recording. There are several occasions where streaming or archiving is needed. A stored call could be used as a substitute or a supplement for minutes of a meeting, an evidence of an oral agreement, or evidence submitted to a court. Archiving calls is particularly important for certain financial institutions, which require that all telephone calls must be recorded and archived for regulatory compliance. Archiving video calls for regulatory compliance may also become a requirement.

Further, streaming a conference is useful in cases where only a limited number of participants are active, while the remaining participants are spectators.

One way of archiving video calls is simply to record the analog video and audio outputs from a codec. Another commonly used method is to record a call by connecting a specialized H.323 or SIP endpoint into the call, and turning the call into a multipoint call. The specialized H.323 or SIP endpoint will then record the entire session on behalf of the other parties connected.

One problem with prior art is that they are typically able to record only a mix of the audio, but not video from both parties separately. To exemplify, two scenarios of a point-to-point call according to prior art are described in the following.

Video from a first party is displayed and therefore recorded in full screen, while video from the second party appears, and is recorded, as a picture-in-picture (i.e. a small window) within the larger window. This is not an optimal recording, since the resolution of the picture-in-picture window is less than the actual resolution. The lower resolution of the picture-in-picture makes it difficult to view details, and the picture-in-picture will overlay part of the large image and hide information.

Video is recorded in a voice-switched mode. This means, that video from the current talker is recorded. When the other party starts talking, video is recorded from that party. The problem here is that video is recorded in a "half duplex" mode, i.e. you cannot see both parties at the same time. This means that non-auditory information may be lost. Also, consider the case where you have deaf people using sign language—voice-switching clearly does not work for this mode of operation.

SUMMARY OF THE INVENTION

It is an object of the present invention to provide a method and a gatekeeper that overcomes the drawbacks described above.

In particular, the present invention discloses a method for archiving or streaming media data in a H.323 or SIP call between a number of endpoints through a gatekeeper in which at least one of the endpoints is registered, by instructing the gatekeeper to operate in a routed media mode, and consecutively generating copies of media data originating from each respective endpoint.

Further, a gatekeeper is disclosed in which at least one of a number of endpoints in a first H.323 or SIP call is registered, wherein a media data distributing module is configured to consecutively generate copies of media data originating from each respective endpoint in the first H.323 or SIP call when the gatekeeper is in a routed media mode.

BRIEF DESCRIPTION OF THE DRAWINGS

In order to make the invention more readily understandable, the discussion that follows will refer to the accompanying drawings, wherein.

DETAILED DESCRIPTION OF THE INVENTION

Figure 1:
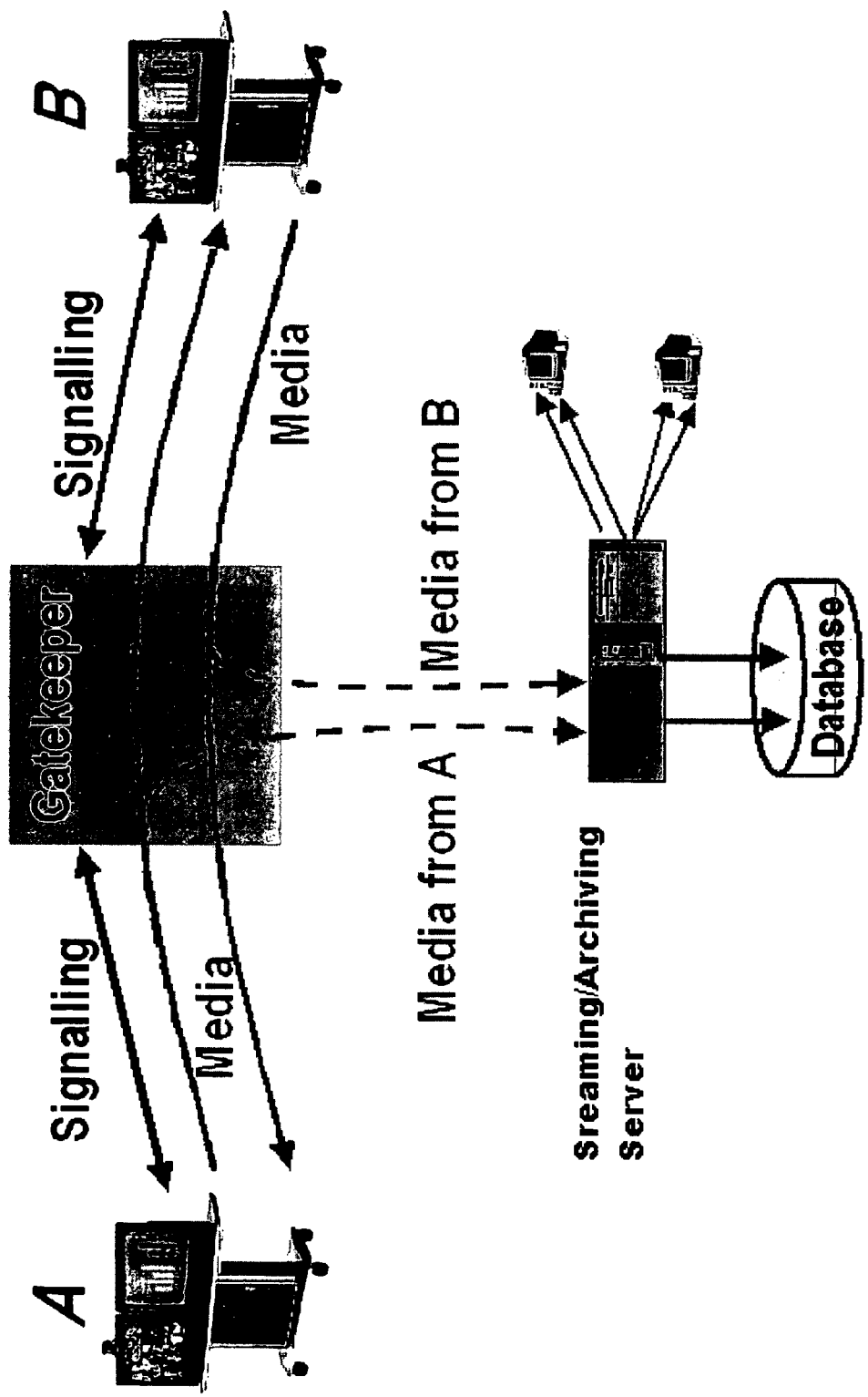
FIG. 1 shows an illustration of the signalling and media flow in one embodiment of the present invention.

In the following, the present invention will be discussed by describing a preferred embodiment, and by referring to the accompanying drawings. However, people skilled in the art will realize other applications and modifications within the scope of the invention as defined in the enclosed claims.

According to the present invention, the Gatekeeper is adjusted to forward a media stream to be recorded to an appropriate streaming/archiving server, or alternatively to have streaming and archiving modules incorporated.

The present invention includes a Gatekeeper configured to run in a Routed Media mode, wherein the media (voice and video) is routed through the Gatekeeper rather than directly from endpoint to endpoint.

There are two models for call routing through a Gatekeeper: direct mode and routed mode. The routed mode is the more widely preferred model. When the gatekeeper performs address translation, the gatekeeper provides endpoints with the transport address for the call signalling channel destination.

In the direct mode, the gatekeeper provides the endpoints with the address of the destination endpoint and directs them to the call-signalling channel so that all messages can be exchanged directly between the two endpoints without gatekeeper involvement.

However, in the routed mode, the gatekeeper provides its own address as the destination address so that it receives all call-signalling messages and handles routing the call signals between itself and all endpoints during a session. In this case, the gatekeeper keeps at least a signalling channel open while routing the call for the duration of the call. Optionally, the gatekeeper could also keep a media channel open (routed media mode), so that both signalling and media are routed through the gatekeeper.

The routed mode is fundamental for call management, as it performs line-hunting functions, provides separate control over each leg of the call by disconnecting and reconnecting each leg separately, and provides supplementary and proprietary services.

In routed media mode, separate media streams from the respective participant are available in the Gatekeeper. Since media from both parties in a call pass through the same gatekeeper, the gatekeeper can easily create a copy of video from both parties at the same time, and route these multiple video streams to the same archiving server.

According to the present invention, the gatekeeper could then be adjusted to create a copy of the media, which by some initial signalling is sent as an RTSP stream to an archiving server or a content distribution network. RTSP (Real Time Streaming Protocol) is a client-server multimedia presentation control protocol standardised by IETF (RFC 2326), designed to address the needs for efficient delivery of streamed multimedia over IP networks. RFC 2326 is hereby incorporated by reference in its entirety. It leverages existing web infrastructure (for example, inheriting authentication and PICS from HTTP) and works well both for large audiences as well as single-viewer media-on-demand. The Real-time Transport Protocol (RTP) is used in connection with both RTSP and H.323. Thus, the RTP data of the respective media streams of the H.323 call to be recorded in the gatekeeper could simply be copied and streamed according to the RTSP. The data-level compatibility between H.323 and RTSP makes efficient transition between the possible protocols, since only control messages need to be translated.

Alternatively, the Gateway could also be adjusted to initiate a new H.323 call, which is routed to a separate state of the art H.323-to-streaming gateway. The gateway would typically be able to convert the media of the call to suitable formats such as Windows Media® or QuickTime® format. The call could then be stored in a database available for playback at any desktop or display station connected to a LAN or IP network, either in real-time or as a recording.

An exemplary architecture of the present invention is shown in FIG. 1. In this example, Endpoint A and B communicates through a Gatekeeper. The initial signalling indicates that the call should be carried out in a routed media mode, so that media from both endpoints A and B are routed through the gateway. The gatekeeper is further connected to an IP addressable streaming/archiving server, enabling the call to be recorded or streamed to terminals connected to the Internet. The streaming/archiving server is also connected to a database, in which recorded media is being stored.

A request for recording or storing may be originated from both the endpoints and the server-connected terminals. The server-connected terminals must then preferably be authenticated for being allowed to initiate the streaming/or recording of the call between endpoint A and B. When authentication has been carried out, a request message must be sent from the streaming/archiving server to the gatekeeper including an identification of the call to be recorded or streamed. In the case of a streaming/archiving request from one of the endpoints, the request message could be incorporated in the initial signalling of the call, including an identification of the streaming/archiving server and optionally the terminals to which streaming is to be addressed.

When the call is initiated, and streaming is stated, the gatekeeper sets up a separate H.323 call to the streaming/archiving server, which includes the media of both endpoints. The server then converts the received media of the H.323 call to RTSP, and streams the data to the terminals that are authorised to playback the call. Alternatively, the media is stored in the database in a selected format, such as e.g. Windows Media® or QuickTime®.

If the gatekeeper itself is adapted with a H.323-to-streaming conversion function, it is unnecessary to initiate a separate call. The media will then be sent as an RTSP stream to the server, which in this case would act as a content distribution server.

One of the advantages of the present invention is that no additional call is required from the endpoint (i.e. in the case of a point-to-point call, there is no need to turn the call into a multipoint call) which is the case in prior art technology for streaming/archiving multimedia calls.

Further, according to the present invention, the archiving and streaming functionality becomes a network resource, handled by the gatekeeper, rather than a resource that is adjacent to an endpoint.

Figure 2:
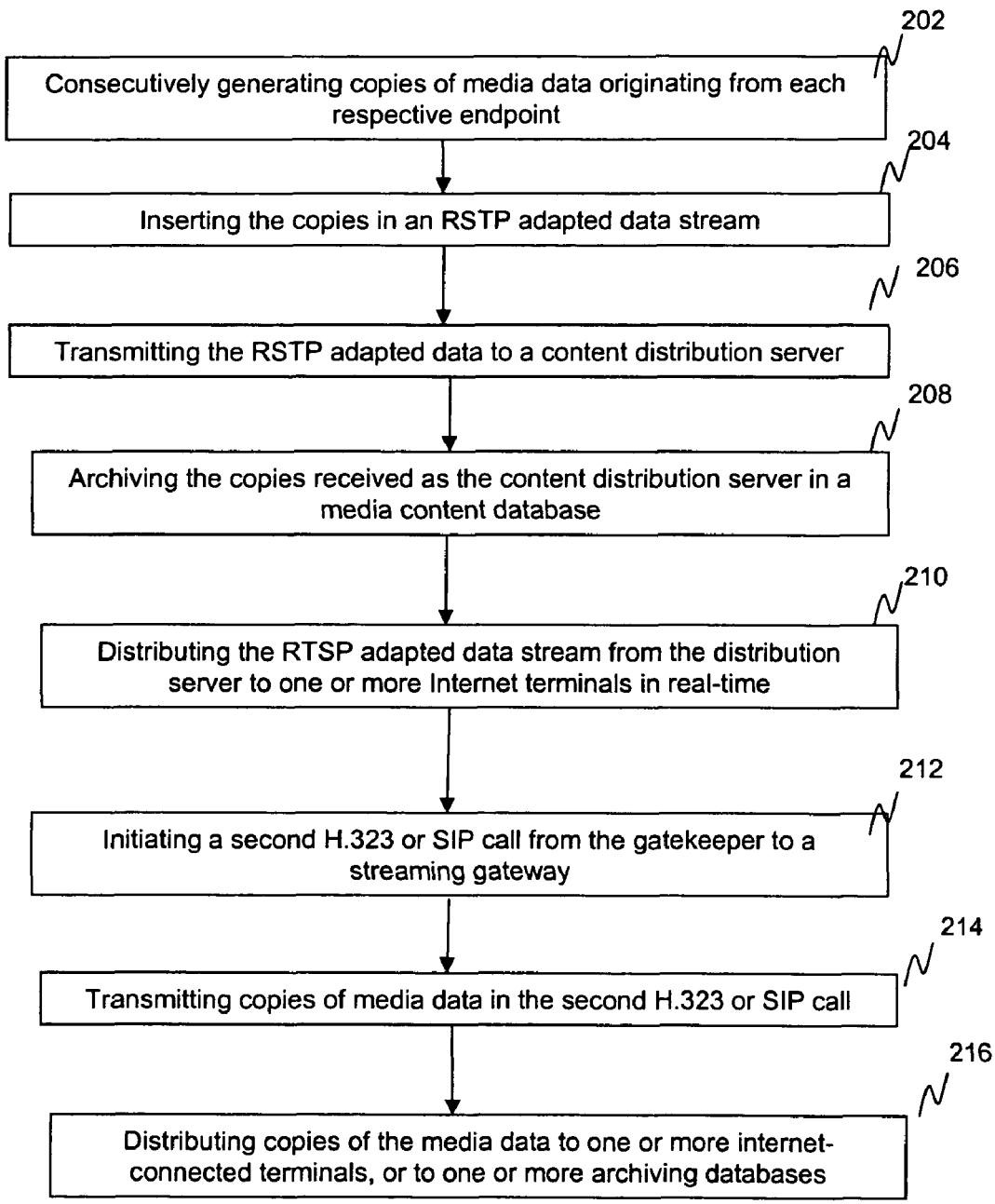
FIG. 2 is a flow chart illustrating an embodiment of a method according to the present invention.

FIG. 2 shows a method for archiving or streaming media data from a first H.323 or SIP call between a plurality of endpoints through a gatekeeper in which at least one of the endpoints is registered. In step 200, a gatekeeper is instructed to operate in a routed media mode. In step 202, the gatekeeper consecutively generates copies of media data originating from each respective endpoint. In step 204, the copies are inserted in an RSTP adapted data stream. In step 206, the RSTP adapted data is transmitted to a content distribution server. In step 208, the copies received at the content distribution server are archived in a media content database. In step 210, the RTSP adapted data stream is distributed from the distribution server to one or more Internet terminals in real-time. In step 212, a second H.323 or SIP call is initiated from the gatekeeper to a streaming gateway. In step 214, the copies of media data in the second H.323 or SIP call are transmitted. In step 216, the copies of the media data are distributed to one or more internet-connected terminals, or to one or more archiving databases.

Figure 3:
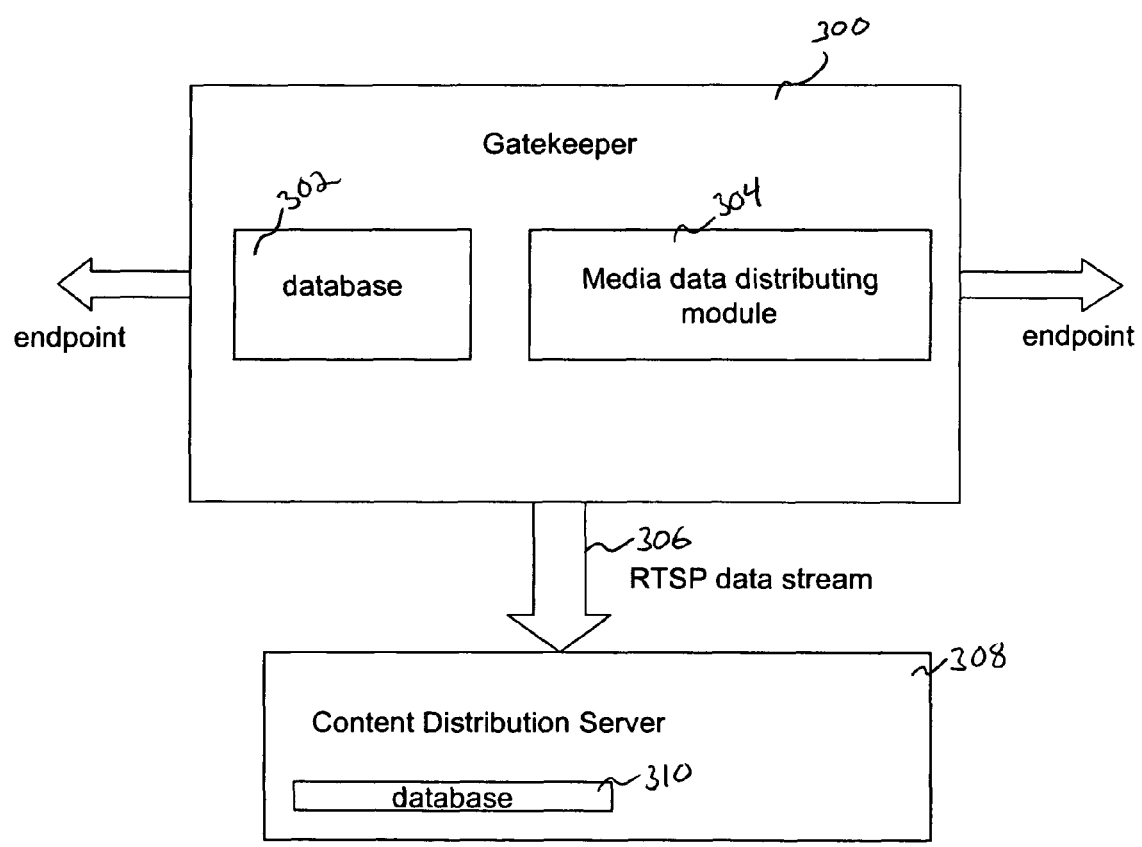
FIG. 3 is a block diagram of an embodiment of a gatekeeper according to the present invention.

FIG. 3 is a non-limiting embodiment of a gatekeeper shown in FIG. 1. Gatekeeper 300 includes a database 302 which stores registration information of at least one of plurality of endpoints connected to the gatekeeper. Gatekeeper 300 includes a media data distributing module 304. Media data distributing module 304 is configured to consecutively generate copies of media data originating from each respective endpoint in a first H.323 or SIP call when the gatekeeper is in a routed media mode. Media data distributing module 304 is further configured to insert the copies in an RTSP adapted data stream 306 to a content distribution server 308. The content distribution server 308 is configured to store the copies in database 310.

Media data distributing module 304 is further configured to initiate a second H.323 or SIP call from the gatekeeper to a streaming gateway and to transmit the copies of the media data in the second H.323 or SIP call.

Figure 4:
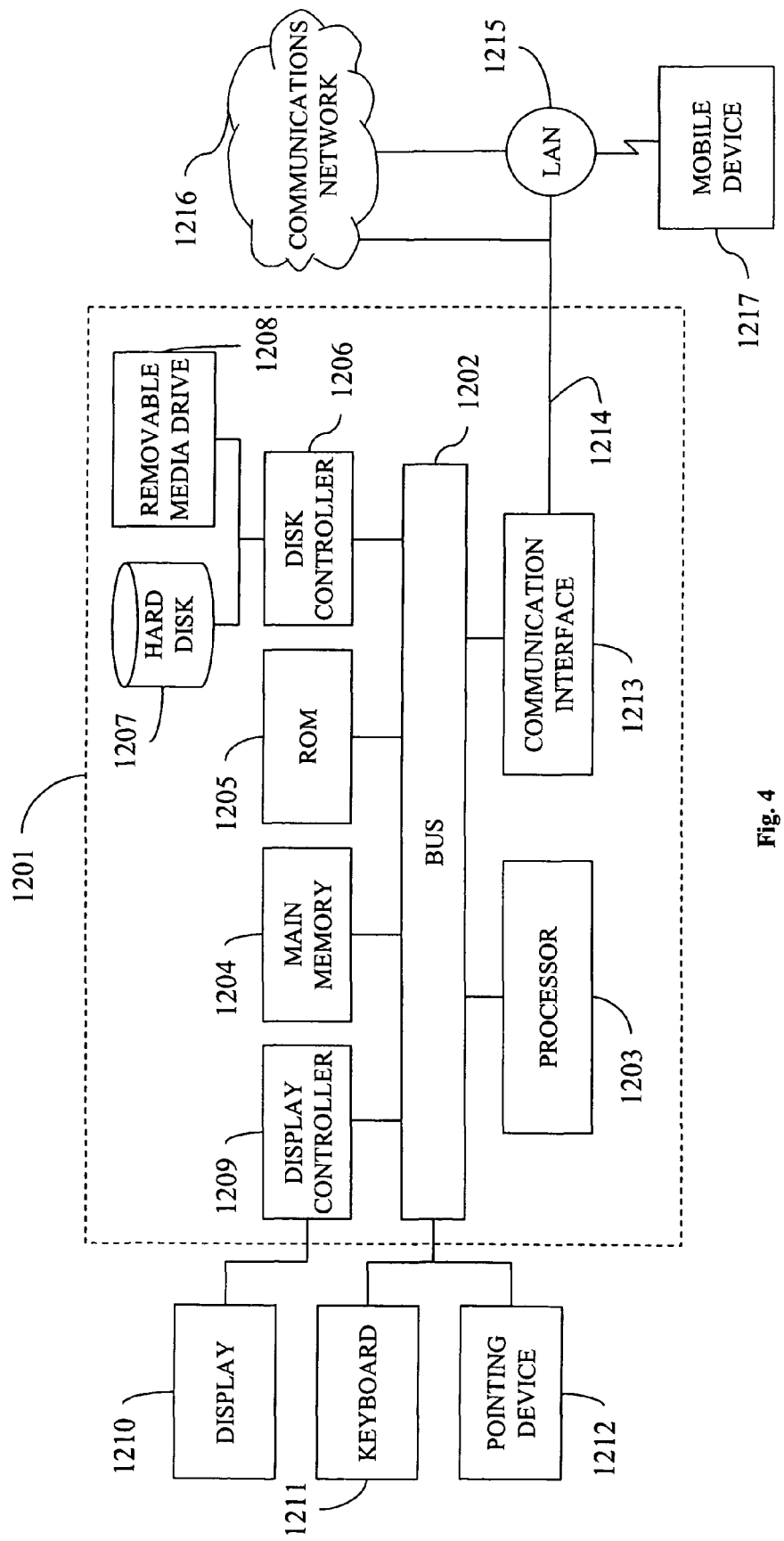
FIG. 4 is a block diagram of an embodiment of a computer used to implement the present invention.

FIG. 4 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein.

The invention claimed is:

1. A method for archiving or streaming video conference data from a first video conference call between a plurality of video conference endpoints through a gatekeeper in which at least one of the video conference endpoints is registered with the gatekeeper, the method comprising:
    managing video conference activities with the gatekeeper;
    operating the gatekeeper in a routed media mode where the video conference data originating from the plurality of video conference endpoints is routed through the gatekeeper;
    receiving, at the gatekeeper, separate video conference media streams originating from each of the plurality of video conference endpoints participating in the first video conference call;
    consecutively generating, at the gatekeeper, copies of all of the separate video conference media streams originating from each of the video conference endpoints participating in the first video conference call; and
    archiving said copies of all of the separate video conference media streams at a content distribution server in a media content database.

2. The method according to claim 1, further comprising:
    inserting said copies in an RTSP adapted data stream; and
    transmitting said RTSP adapted data stream to the content distribution server.

3. The method according to claim 2, further comprising:
    distributing said RTSP adapted data stream from said distribution server to one or more Internet terminals in real-time.

4. The method according to claim 1, further comprising:
    initiating a second call from the gatekeeper to a streaming gateway utilizing H.323 or SIP;
    transmitting said copies of media data in said second H.323 or SIP call; and
    distributing said copies of media data to one or more internet-connected terminals or to one or more archiving databases.

5. A gatekeeper in which at least one of a plurality of video conference endpoints in a first video conference call is registered, comprising:
    a receiving unit configured to receive separate video conference media streams originating from each of the plurality of video conference endpoints participating in the first video conference call;

a media data distributing module configured to consecutively generate copies of all of the separate video conference media streams originating from each of the plurality of video conference endpoints participating in the first video conference call when the gatekeeper is in a routed media mode; and a media content database of a content distribution server that is configured to archive said copies of all of the separate video conference media streams.

6. The gatekeeper according to claim 5, wherein said media data distributing module is further configured to insert said copies in an RTSP adapted data stream, and to transmit said RTSP adapted data stream to the content distribution server.

7. The gatekeeper according to claim 5, wherein said media data distributing module is further configured to initiate a second call utilizing H.323 or SIP from the gatekeeper to a streaming gateway and to transmit said copies of media data in said second call.

8. A non-transitory computer readable storage medium encoded with instructions which when executed by a gatekeeper causes the gatekeeper to perform a method for archiving or streaming video conference data from a first call between a plurality of video conference endpoints through the gatekeeper in which at least one of the video conference endpoints is registered with the gatekeeper, the method comprising:

managing video conference activities with the gatekeeper;

operating the gatekeeper in a routed media mode where the video conference data originating from the plurality of video conference endpoints is routed through the gatekeeper;

receiving, at the gatekeeper, separate video conference media streams originating from each of the plurality of video conference endpoints participating in the first video conference call;

consecutively generating, at the gatekeeper, copies of all of the separate video conference media streams originating from each of the video conference endpoints participating in the first video conference call; and archiving said copies of all of the separate video conference media streams at a content distribution server in a media content database.

9. The non-transitory computer readable storage medium of claim 8, wherein the method further comprises:

inserting said copies in an RTSP adapted data stream; and transmitting said RTSP adapted data stream to the content distribution server.

10. The non-transitory computer readable storage medium of claim 9, wherein the method further comprises:

distributing said RTSP adapted data stream from said distribution server to one or more Internet terminals in real-time.

11. The non-transitory computer readable storage medium of claim 8, wherein the method further comprises:

initiating a second H.323 or SIP call from the gatekeeper to a streaming gateway;

transmitting said copies of media data in said second H.323 or SIP call; and distributing said copies of media data to one or more internet-connected terminals or to one or more archiving databases.

12. The method of claim 1, wherein the first video conference call utilizes H.323 or SIP.

13. The gatekeeper of claim 5, wherein the first video conference call utilizes H.323 or SIP.

14. The non-transitory computer readable storage medium of claim 8, wherein the first video conference call utilizes H.323 or SIP.

* * * * *